H. B. KRAUT.
PUNCHING AND SHEARING MACHINE.
APPLICATION FILED AUG. 22, 1910.

1,035,093.

Patented Aug. 6, 1912.

H. B. KRAUT.
PUNCHING AND SHEARING MACHINE.
APPLICATION FILED AUG. 22, 1910.

1,035,093.

Patented Aug. 6, 1912.

Witnesses
Geo. C. Davies
William Goldberger.

Inventor:
Hans B. Kraut
By William B. Hall
Atty.

UNITED STATES PATENT OFFICE.

HANS B. KRAUT, OF CHICAGO, ILLINOIS, ASSIGNOR TO JOSEPH T. RYERSON & SON, OF CHICAGO, ILLINOIS, A CORPORATION OF ILLINOIS.

PUNCHING AND SHEARING MACHINE.

1,035,093.  Specification of Letters Patent.  Patented Aug. 6, 1912.

Application filed August 22, 1910. Serial No. 578,388.

*To all whom it may concern:*

Be it known that I, HANS B. KRAUT, a citizen of the United States, and a resident of Chicago, in the county of Cook and State of Illinois, have invented certain new and useful Improvements in Punching and Shearing Machines; and I do hereby declare that the following is a full, clear, and exact description thereof, reference being had to the accompanying drawings, and to the characters of reference marked thereon, which form a part of this specification.

This invention relates to improvements in punching and shearing machines, certain of the improvements being applicable to either a punching or a shearing machine, while others of the improvements are adapted to punching machines.

One of the features of my invention resides in the construction of the machine frame, which is adapted to either a punching or shearing machine. The frame is of that kind embracing vertical frame plates that are suitably bolted or riveted together with cast metal filler pieces between the same, such for instance, as shown in my prior application for United States Letters Patent, filed September 3rd, 1909, Serial Number 516,010.

Among the present improvements relating to this phase of the invention is one relating to an improved means for connecting the side plates with the interposed cast metal filler pieces, so arranged as to prevent relative shifting of the frame plates and filling pieces in the planes of said plates under the severe punching and shearing stresses brought on the frame, and thereby prevent racking of the frame due to such relative movement of the frame members so as to hold the frame members in rigid coöperative relation and maintain the operative parts of the machine mounted on and supported by the frame in predetermined accurate working alinement.

A further feature of improvement in the frame resides in the rigid connection of the interposed cast metal throat piece, shown in my aforesaid prior application, with the parts of the cast metal filler members that are located at the edges of the frame, so as to make the filling element of the frame more rigid, and also to make it practical to provide the bearings for the several shafts of the machine in the cast metal filler element instead of separately mounting certain of the bearings on the side plates, or on the separately attached filler bars, as shown in my aforesaid prior application.

A further feature of improvement in the frame resides in the attachment and connection of the cast metal throat piece with the punching or shearing head in such manner as to transmit the punching and shearing stresses more directly from the head to the throat piece, and thereby prevent the head from being deflected upwardly by reason of such stresses, and thus hold the upper and lower tools in proper coöperative alinement.

A further feature of improvement in the frame resides in the employment of a plurality of such filling elements or members combined with more than two rigidly attached frame plates, thus enabling a frame of this kind to be adapted to extra large machines, while employing filler members of moderate size and readily castable proportions.

Other features of my invention relate to means for facilitating the various operations of the machine, to the clutch mechanism for connecting power to and disconnecting it from the machine, and to means for gearing the motor to the machine.

The frame of the machine comprises, in general terms, two side plates 25, 25 which are cut away at the front of the machine to provide the throat opening 26, and an interposed cast metal filler member to which said plates are firmly riveted. Said filler is composed of a throat piece 27, which is of general horse shoe shape, with the upper and lower members 28, 29 arranged respectively above and below the throat opening and with the closed thickened portion 30 of the throat piece arranged in rear of the throat opening. The lower member of the throat piece extends, for the principal part of its length, from the throat opening to the bottom of the frame. The filler comprises, in addition to the throat piece, the top, rear and bottom members 32, 33, 34, which are made integral with the throat piece and the separately formed front top member 35. The said rear member 33 of the filler is connected with the rear closed portion of the throat piece by the connecting portion 36. Extending upwardly from and integral with the upper member of the throat piece are two parallel lugs 37, 38, the latter member 38 being integral with the upper rear filler member 32. The filler member 35 extends forwardly from the upper end of the lug 37 to the tool head 40 of the frame. In the recess formed between said lugs 37, 38 is removably fitted a bearing block 41 having a bearing opening, in line with openings in said lugs, to receive the main shaft 42 of the machine. Said bearing block 41 is removably fixed in the upwardly opening recess of the filler and between the side plates by bolts 43. The integral rear filler member 33 is formed with an integral bearing 44 for the rear end of the shaft 42.

Figures 6, 8, 9, 10, 11, 12:
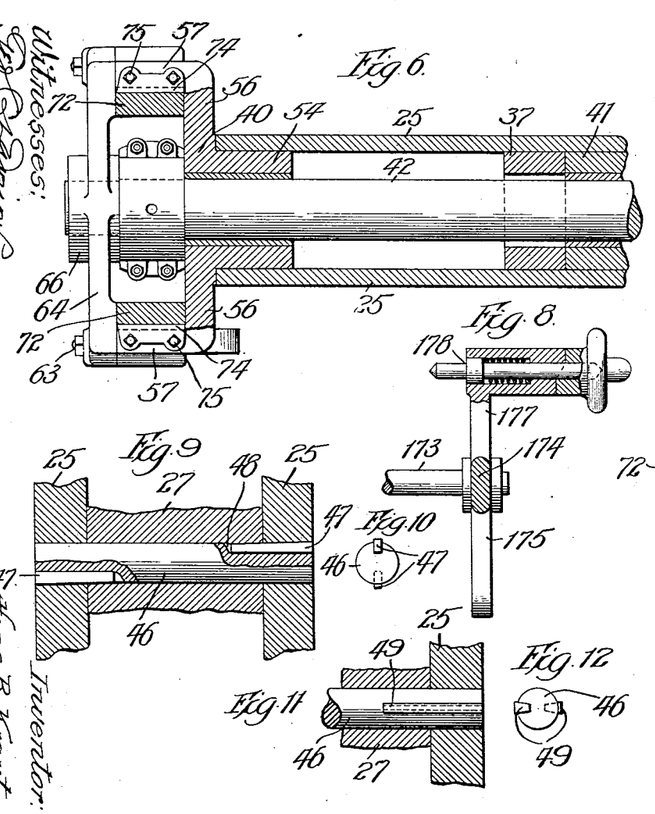
Fig. 6 is a horizontal section indicated generally on the indirect line 6—6 of Fig. 5, looking downwardly.
Fig. 8 is a fragmentary detail of the hand actuated and locking lever at the front of the machine for controlling the main clutch of the machine.
Fig. 9 is a section through the frame plates and filler showing one of the steel holding pins and its locking keys.
Fig. 10 is an end elevation of said pin.
Fig. 11 is a fragmentary view similar to Fig. 9, showing a modification of the locking key.
Fig. 12 is an end elevation of the pin and its locking key shown in Fig. 10.

In accordance with one feature of my invention the side plates and interposed filler are fastened rigidly together by the combined action of the rivets 45 (or other suitable headed devices) that pierce the plates and filler and are upset at their ends on the outer sides of the plate, and the steel pins 46 which latter are driven tightly into alined openings in the plates and filler and are flush at their ends with the faces of said plates. The headed rivets hold the plates tight against the filler and prevent separation thereof, and the steel pins prevent the plates and filler from shifting relatively to each other in their planes. Said pins may be made of nickel steel. The said pins may be locked in place by the longitudinally tapered or wedge shaped keys 47 shown in Figs. 9 and 10 adapted to be driven into the longitudinally tapered grooves 48 at the ends of the pins, the groove at one end of each pin being located at one side thereof, and that at the other end of the pin being located on the other side of the pin. In Figs. 11 and 12 I have shown locking keys 49 for the pins that are transversely tapered to engage like tapered grooves in the ends of the pins.

It has been found in the use of rivets (which are set hot) to fasten the plates to the filler, said rivets contract as they cool so as to be of materially smaller diameter than the openings in the plates and filler through which they pass, and this slight looseness of fit of the rivets in the plates and filler permits the frame parts to shift relatively to each other in their planes under the punching and shearing stresses brought on the frame. Such relative shifting of the plates and filler has a tendency to further loosen the rivet connections and to permit the frame to rack to such extent as to permit the working parts on the frame to get out of working alinement.

In large machines for extra heavy work, for which the machine herein shown is especially designed, it is not practicable to upset, when cold, the large rivets necessary to be employed. With the use of the steel pins 46, which are interspersed throughout the frame with the rivets, I am enabled to effect an attachment of the frame parts which will not only hold them from spreading apart, but will effectively prevent shifting of said parts in their planes. Therefore, a most effective bond or connection is provided between the plates and filler in such manner that the working stresses are uniformly distributed throughout the frame parts and the frame prevented from racking or becoming loosened.

Figure 7:
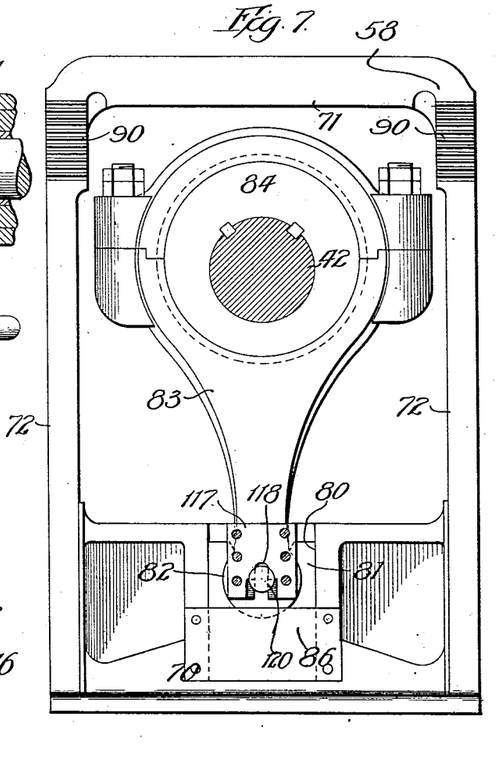
Fig. 7 is a rear elevation of the tool carriage, its actuating pitman and associated parts.

As a further and separate improvement the head 40 is connected directly to the upper member 28 of the throat piece in such manner as to positively hold the head from rising relatively to the throat piece under working stresses brought on the head. To this end the head is provided with a rearwardly extending portion 50 that is arranged between the side plates in the manner of the filler members. Said extension may have a rearwardly opening notch 51, and the upper member of the throat piece may be provided with a reduced extension 52 that fits in and fills the notched portion of the head. The lower wall of said recess 51 provides an upwardly facing surface 53 of considerable length which engages the lower side of the throat piece extension 52, and thus provides a direct and positive connection of the head with the throat piece. With this construction, the resistance against the rising movement of the head under the punching action of the machine is taken directly by the massive cast metal throat piece, instead of through the intermediary of the plates and rivets, as in the construction set forth in my aforesaid prior application. The engagement of the upper wall of said socket with the throat piece also serves to prevent the head twisting relatively to the throat piece and the side plates. The said head 40 is provided in its rearwardly extending portion 50, between the side plates, with a bearing 54 for the forward end of the operating shaft 42. The front end of the upper filler bar 35 extends over and rests on said head. The said rearward extension 50 of the tool head is fixed to the side plates 25 and the throat piece by means of the bolts 55, 55 and the steel pins 46. The said head 40 is widened at its lower end in front of the side plates, it comprising the laterally extending vertical webs 56, 56, having at their outer sides the forwardly extending vertical flanges 57, 57 which inclose a chamber to receive the tool carriage, designated as a whole by 58 (Fig. 7). Attached to the forward edges of the side flanges 57 of the head, as by the bolts 63, is a casting 64 which constitutes the front wall of the chambered head, and also a bracket to receive the forward, reduced end 65 of the main or power shaft, said casting being enlarged to form a bearing 66 for said reduced end of the shaft.

Figure 1:
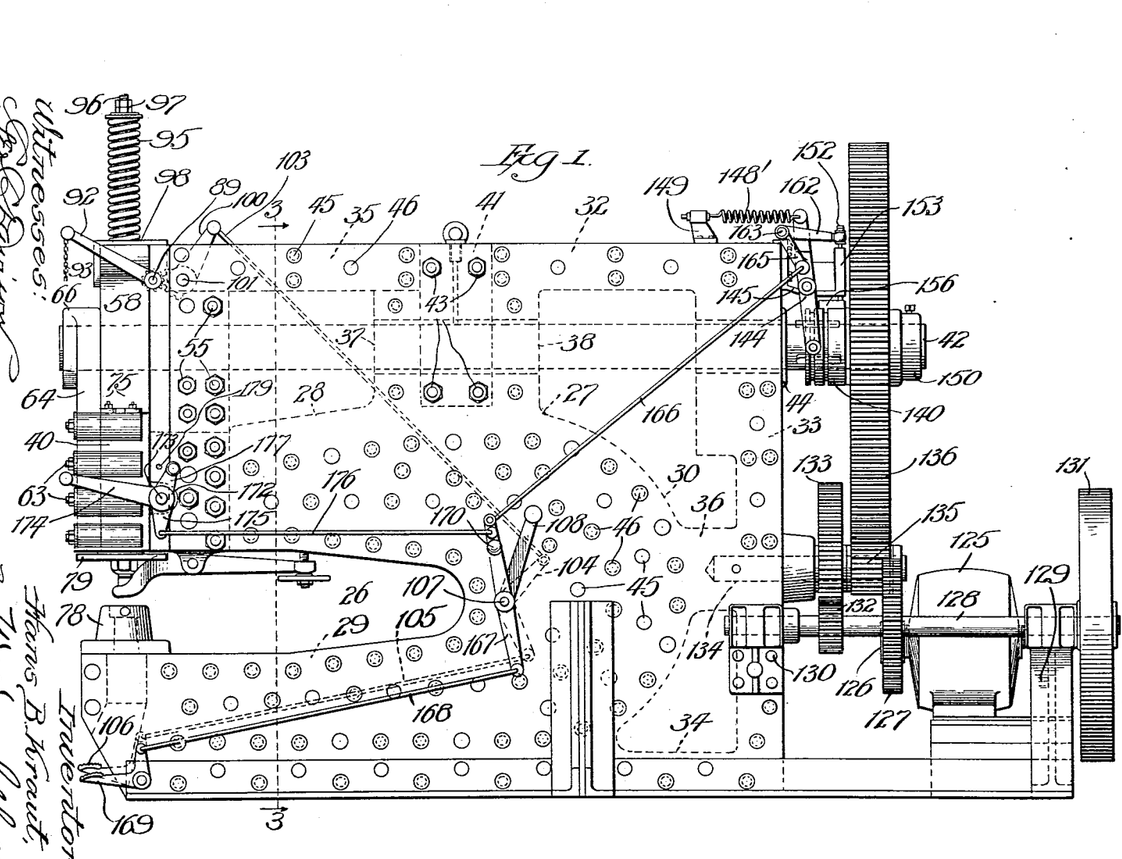
Figure 1 is a side elevation of a punching machine embodying my invention, as seen from the right hand side thereof.
Figure 2:
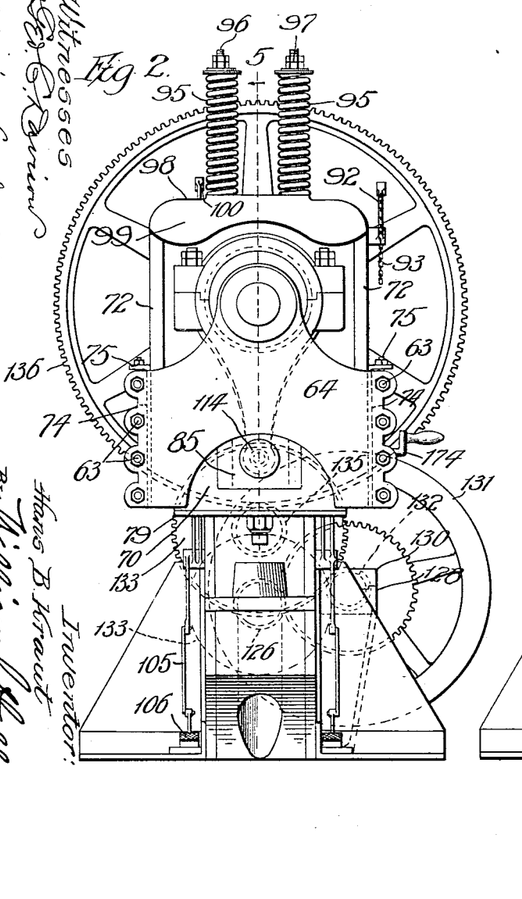
Fig. 2 is a front elevation thereof.
Figure 3:
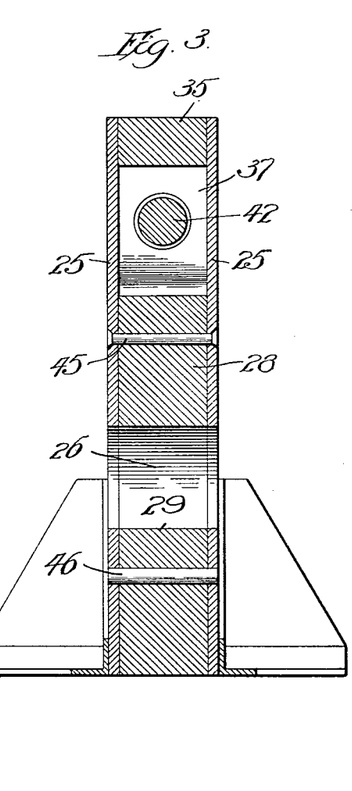
Fig. 3 is a vertical section of the frame, on the line 3—3 of Fig. 1.
Figure 4:
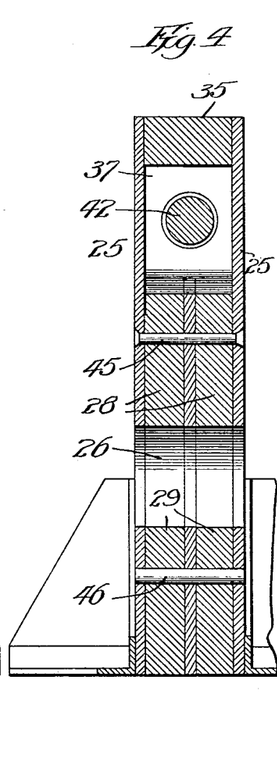
Fig. 4 is a similar section of a modified form of frame.
Figure 5:
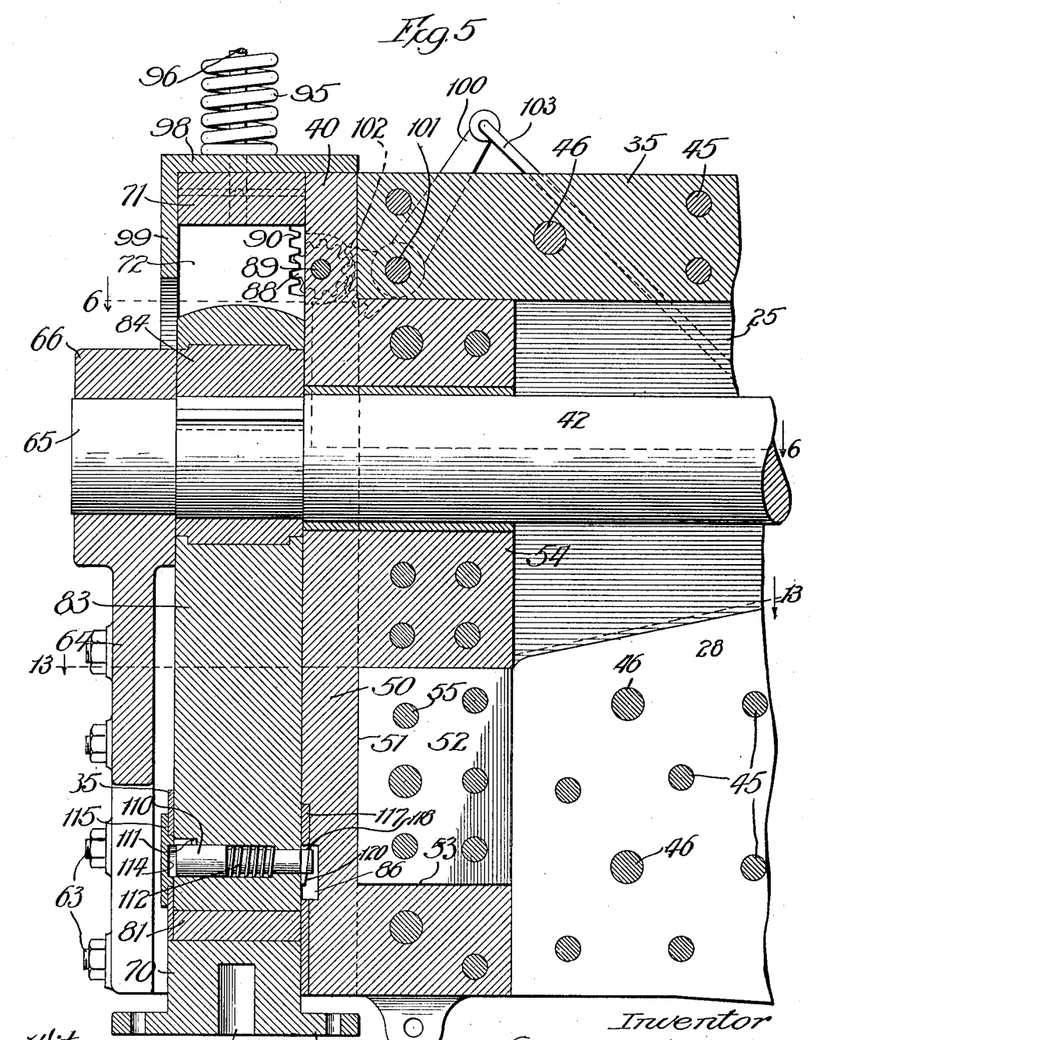
Fig. 5 is a vertical section, on the line 5—5 of Fig. 2, with parts omitted.
Figure 13:
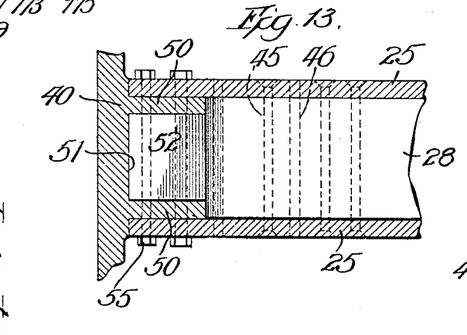
Fig. 13 is a horizontal section, on a reduced scale, on line 13—13 of Fig. 5, looking downwardly.
Figure 14:
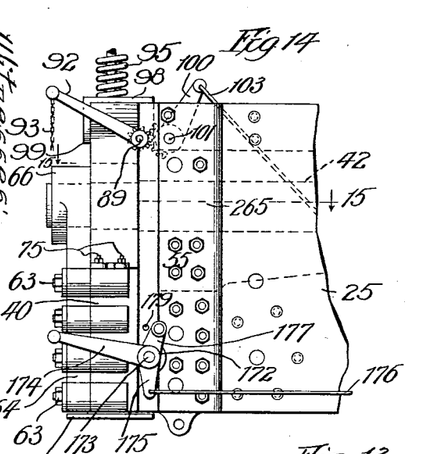
Fig. 14 is a fragmentary side elevation of the upper front end of the machine, showing a modified form of head and the means for attaching it to the frame.
Figure 15:
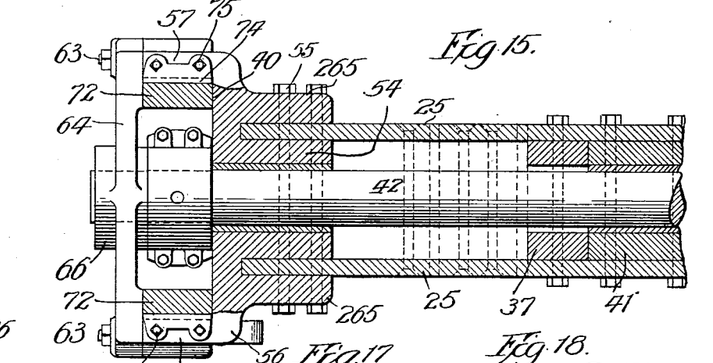
Fig. 15 is a horizontal section on the indirect line 15—15 of Fig. 14.
Figures 16, 17, 18:
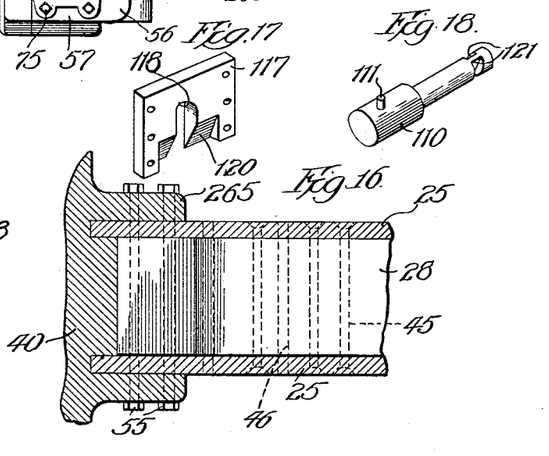
Fig. 16 is a view similar to Fig. 13, showing the form of head illustrated in Figs. 14 and 15.
Figs. 17 and 18 are perspective views of the tripping plate and locking pin, respectively, by which the carriage actuating pitman is connected to and disconnected from the carriage.
Figure 19:
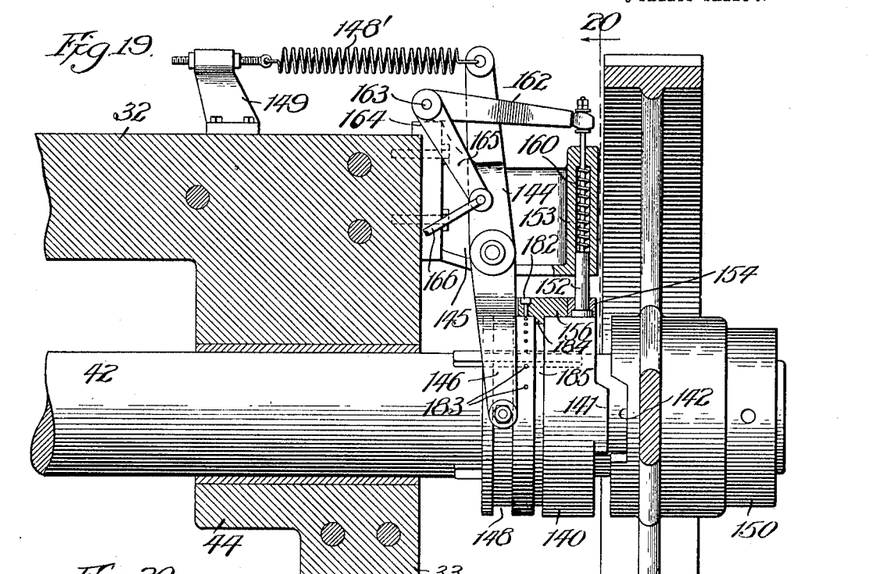
Fig. 19 is a view partially in vertical section and partially in elevation of the main shaft clutch mechanism, taken in the plane of the axis of the shaft.
Figure 20:
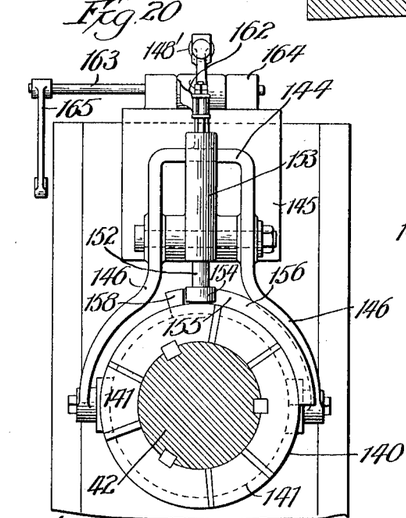
Fig. 20 is a vertical section, on the line 20—20 of Fig. 19, looking in the direction indicated by the arrows.
Figure 21:
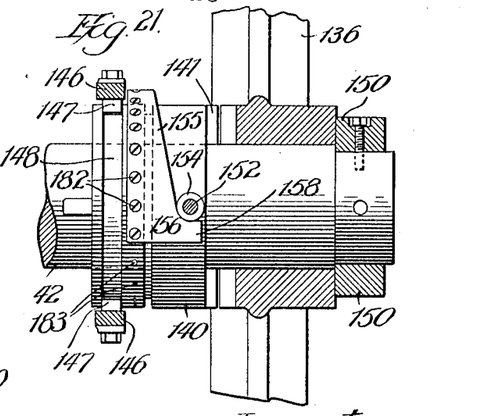
Fig. 21 is a partial plan view and partial horizontal section of the clutch mechanism shown in Figs. 19 and 20.

As shown in Figs. 14, 15 and 16, I may attach the head 40 to the side plates by providing the head with the side flanges or arms 265 which fit outside of the side plates and are bolted thereto. In this construction the socket in the lower portion of the extension 50, shown in Figs. 5 and 13, is omitted and the forward end of the upper member of the throat piece fills the entire space between the plates 25, as shown in Fig. 16.

The tool carriage 58, before referred to, embraces a lower transverse member 70, an upper transverse member 71 and parallel side members 72, 72, the latter of which have guiding engagement in ways formed between webs 56 and the castings 64. The said side members of the carriage may directly engage at their outer sides tapered adjusting plates 74 arranged between the same and side flanges 57, and adapted to be adjusted by the adjusting bolts 75 connected to the upper, out-turned ends of said tapered plates. The use of the tapered plates enable the wear on the carriage and the guideway therefore to be readily taken up. The lower member 70 of the carriage may be provided with a tool socket 77 to receive the shank of a punch or other tool that coöperates with the punch die 78 supported on the lower member of the throat piece. Said carriage member 70 may also be provided with apertured flanges 79 to which to attach a plate to removably receive a universal tool attaching block, thereby providing for the ready application of different tools to the machine.

The lower member 70 of the tool carriage is formed with an upwardly opening notch 80 to receive a pitman shoe 81 which is fitted loosely over the lower headed end 82 of the operating pitman 83. The said pitman is loosely mounted on an eccentric 84 keyed to or otherwise fixed to the operating shaft 42 within the chambered head and between the side members of the carriage. The open tool carriage is vertically movable in the head, independently of the carriage actuating pitman and the pitman shoe, to permit the carriage to be depressed to center the tool preliminary to the punching operation; and after the tool has been thus centered pressure is transmitted from the pitman to the shoe to the lower member of the carriage to depress the carriage and tool to punching position. Means are also provided for positively connecting the pitman with the carriage at the limit of the power stroke of the pitman so as to positively strip the tool from its work during the backstroke of the pitman, said means being sructed and arranged to operate at the limit of the back-stroke of the pitman to again disconnect the pitman from the carriage to permit the latter to be depressed to centering position. For the purpose of such relative movement of the carriage and pitman the pitman shoe 81 is loosely mounted in the notched portion 80 of the lower member of the carriage to permit it to rise and fall relatively to the carriage. The shoe is held laterally in place on the lower headed end of the pitman by means of plates 85, 86 that are bolted or otherwise fixed to the front and rear sides, respectively, of the notched lower member of the carriage.

The carriage may be depressed, for the purpose of centering the tool, through the medium of pinions 88 fixed to the horizontal rotative shaft 89 that is mounted in the head 40 in rear of the carriage, said pinions engaging rack teeth 90 on the rear sides of the side members of the carriage. The shaft 89 is adapted to be rotated to lower the carriage by means of a crank arm 92 attached to and extending forwardly from one end of the shaft, (at the right hand side of the machine) and provided in front of the machine with a chain or other manually engageable device 93 whereby it may be swung downwardly. The carriage is normally held in its upper position by means of one or more spiral, expansive springs 95 which surround rods 96, 96 attached to and extending upwardly from the upper member 71 of the carriage and are interposed between shoulders 97 at the upper ends of the said rods and the horizontal member 98 of a cap piece that is applied over the upper end of the head. Said cap piece has a vertical member 99 that extends downwardly in front of the head and has guiding engagement with the side members of the carriage. The carriage may also be depressed for the purpose of centering the tool by foot power through devices made as follows: 100 designates a lever (at the left hand side of the machine) that is pivoted to a horizontal shaft 101 mounted in the forward end of the filler bar 35 and provided with a toothed sector 102 which meshes with the pinion 88 on the adjacent end of the carriage actuating shaft 89. The outer end of said lever 100 is connected by means of a link 103 with one arm of a lever 104 located at the left side of the machine frame in rear of the throat. The other arm of the lever 104 is connected by a link 105 with a foot lever or treadle 106 located at the front, left hand side of the machine. In order that the centering mechanism may be actuated from the right hand side of the machine from a position at the back of the throat, the shaft 107 on which the lever 104 is mounted, may be extended through the machine frame, and provided on the right hand side of the frame with a hand crank 108. Thus the centering mechanism may be actuated either by foot or hand power at the front of the machine or may be actuated by hand power from a position in rear of the throat, at the right hand side of the machine. This latter position becomes convenient when operating on relatively wide plates, at which time the front actuating devices are not conveniently accessible.

The means for positively connecting the pitman with the carriage to raise the carriage during the back-stroke of the pitman for the purpose of stripping the tool from its work is made as follows: The pitman head is provided with a transverse opening in which reciprocates a pin 110 that is non-rotatively fixed in said opening by means of a stud 111 engaging a groove at the side of the opening. The length of the pin is greater than the width of the pitman head. A spiral spring 112, which surrounds the reduced portion of said pin and is interposed between a shoulder on the pin and an interior shoulder in the pitman head opening, tends to thrust the pin forwardly with its forward end engaged with a socket 114 in the front plate 85 of the carriage. This socket may be formed in a separate hardened plate 115 fixed to the plate 85. When the front end of said pin engages said socket it provides an interlocking connection between the pitman and carriage which causes the pitman to give positive movement to the carriage. The pin is tripped out of said socket at or near the limit of the back-stroke of the pitman by means of a stationary tripping plate 117 fixed to the head and lying flat against the rear face of the pitman, the carriage and pitman moving relatively to the plate. Said plate is provided in line with the pin with a notch 118 (Fig. 17) into which the rear reduced end of the pin is adapted to extend, and is provided at the sides of its notch with downwardly and forwardly inclined cams 120. The reduced end of the pin is provided on its opposite sides with upwardly opening notches 121 having inclined rear walls to engage the cams 120 of the plates. When the rear notched end of the pin is raised into engagement with the notched tripping plate, the cams 120 act on the inclined surface of the pin to withdraw the pin from the socket 114 and thereby disconnect the pitman from the carriage to permit the carriage to be depressed to centering position. The pin again enters the socket 114 when the pitman reaches the limit of its down stroke to again effect an interlocking connection between the pitman and carriage.

The machine is shown as driven by a motor 125 located at the rear of the machine frame through driving connections made as follows: The pinion 126 of the motor shaft meshes with a gear wheel 127 that is fixed to a balance wheel shaft 128 which is offset from the center of the machine and is mounted at its outer end in a standard 129 and at its inner end in a bearing carried by a bracket 130 fixed to and extending laterally from the side of the machine frame. Said shaft 128 carries at its outer end a fly or balance wheel 131, and is provided near its inner end with a pinion 132 that meshes with a gear wheel 133 which is rotatively mounted on a stub shaft 134 which extends into and is secured in an opening in the rear member 33 of the cast metal frame filler. Rotating with the gear wheel 132 is a pinion 135 that meshes with a large gear wheel 136 which is adapted to rotate loosely on the main operating shaft, and to be clutched to said shaft to rotate the latter, and therethrough, actuate the tool carriage actuating pitman.

The arrangement of gearing described locates the armature shaft of the motor in the plane of the operating shaft and avoids the objectionable side stress or draft which occurs if the high speed motor be located out of the plane of said operating shaft.

The clutch mechanism by which the gear wheel 136 is clutched to the main operating shaft 42 is made as follows: 140 designates a clutch collar or spool slidable on and keyed to the rear end of the operating shaft. Said collar is provided at its outer end with angularly spaced clutch teeth 141 adapted to engage like spaced notches or recesses 142 in the inner end of the hub of the gear wheel 136. The said sliding clutch collar or spool is shifted into its clutching position by means of a shipping lever 144 that is pivoted to a bracket 145 attached to the rear end of the machine, said shipping lever having fork arms 146, 146 which pass on opposite sides of the clutch collar and are provided at their lower ends with inwardly extending studs 147 that engage in an annular groove 148 in the inner end of the clutch collar, thereby permitting the clutch collar to be rotated relatively to the shipping lever. A tension spring 148', attached at one end to the upper end of said lever and at its other end to a bracket 149 on the machine frame, acts to normally hold the clutch collar in its position to lock the gear wheel 136 to the main operating shaft 42. The operating shaft 42 is provided outside the gear wheel 136 with a thrust collar 150, fixed rigidly to the shaft, to receive the thrust exerted on said gear wheel when the clutch is thrown into operation. The said clutch collar is tripped into its inward or inoperative position by means of a tripping pin 152 which slides vertically in a tubular bearing 153 formed on the bracket 145, said pin being provided with a bearing roller 154 which engages, when the tripping pin is in its lowermost position, a laterally facing cam surface 155 on a tripping plate 156 that is carried by the clutch collar. The lower or entering end of the cam surface 155 of the tripping plates lies in the plane of the bearing roller 154 of the tripping pin when the clutch collar is in its operative or clutching position and when the pin is raised away from the tripping plate. When the pin is lowered, therefore, the bearing roller of said pin engages the lower or entering end of the cam and, as said cam rides past said pin, the pin acts on the cam to force the clutch collar inwardly away from the gear wheel 136, and therefore into its inoperative or unclutching position. The said tripping plate is provided at the end of the higher portion of the cam with a stop 158 which is engaged by the bearing roller of the tripping pin, after the gear wheel 136 has been unclutched from the operating shaft 42, and arrests rotation of the operating shaft until the pin is again raised. The said tripping pin 152 is normally held in its lower position by means of a spiral expansion spring 160 contained within the hollow guide bearing 153 and interposed between an interior shoulder of said bearing and a shoulder on the pin.

The pin is adapted to be raised away from the tripping plate by means of a crank arm 162 fixed to a rock shaft 163 that is mounted in bearings 164 on the frame, said rock shaft being provided at the right hand side of the machine with a crank arm 165 that is connected by a link 166 with the means for operating the tripping pin. Said link is adapted for connection with both manual and foot operating device made as follows: The link 166 is connected at its forward end with the upper arm of a lever 167 that is pivoted between its ends on the shaft 107 of the centering mechanism actuating means. The other or lower end of said lever 167 is connected by a link 168 with a foot lever or treadle 169 that is pivoted to the front end of the frame at the right hand side thereof. Through the connections described the clutch tripping devices may be operated by foot power. Hand power may be applied to operate the tripping pin from the position of an operator in rear of the throat through the medium of a hand piece 170 that is attached to the upper arm of the lever 167.

A second hand actuated device is arranged at the front of the machine, at the right hand side thereof. It consists of L-shaped lever 172 which is pivoted to the stud 173 mounted in the machine frame. One arm, 174, of said lever extends forwardly from its pivot in position to be grasped by the operator when standing at the front of the machine. The other or shorter arm 175 of the lever is connected by a link 176 with the upper arm of the lever 167. The lever 172 is provided with a locking arm 177 which carries a cam-actuated spring-pressed pin 178 (Fig. 8) that is adapted to engage a locking notch 179 in the adjacent side of the machine frame to lock the tripping pin in retracted or elevated position. When the tripping pin is thus locked in its raised or retracted position, the gear wheel remains clutched to the operating shaft 42 and the machine is adjusted for continuous punching. The said tripping plate 156 is fastened to the clutch collar by means of the screw bolts 182 which extend through openings in the inner side margin of the plate into a series of equally spaced screw-threaded openings 183 in the periphery of the clutch collar near its inner end. In order to take the shearing stress off of said bolts when the clutch collar is shifted inwardly by the tripping pin, the tripping plate is provided on its under side with a rib 184 which engages an annular or arcuate groove in the periphery of the collar just outside of the series of screw-threaded openings 183. The series of screw-threaded openings 183 are longer than the plate, and the plate may be angularly adjusted about the periphery of the collar by releasing the screw bolts, shifting the plate endwise in one direction or the other and engaging the screw bolts with a new series of screw-threaded openings. By thus angularly shifting the tripping plate on the clutch collar, I am enabled to arrest the tool carriage actuating pitman either at the limit of its back-stroke or after it has passed its dead center a distance into its down or forward stroke. The latter adjustment is desirable when operating on thin material, inasmuch as the tool is arrested, after each operation, closer to its work.

While I have described the illustrated details of the machine with considerable particularity, it will be obvious that the structural details are capable of variations within the spirit of the invention.

The invention is not limited to the details shown except as such details are hereinafter made the subject of specific claims.

I claim as my invention:—

1. A frame for a punching or like machine composed of plates and an interposed filler, and means for fixedly attaching the frame parts together comprising headed rivets and hard metal pins interspersed throughout the frame and extending through said frame parts, said pins fitting in rigid frictional connection with the parts through which they extend to transmit stresses from one frame part to the other in the direction of their planes.

2. A frame for a punching or like machine composed of side plates and an interposed cast metal filler, headed fastening devices extending through openings in the frame parts to hold them from separation, hard metal headless pins interspersed with said fastening devices and extending through and fitting in rigid frictional connection with the frame parts through which they extend to transmit stress from one frame part to the other in the direction of the planes of said plates, and means engaging the pins and frame parts for holding the pins from endwise displacement.

3. A frame for a punching or like machine composed of side plates and an interposed filler, headed rivets extending through the openings in the frame parts to hold them from separation, hard metal headless pins interspersed with said rivets throughout the frame and extending also through and fitting in rigid frictional connection with said frame parts, and keys engaging the pins and frame parts for holding said pins in place.

4. A frame for a punching or like machine composed of side plates and an interposed filler, headed fastening devices extending through openings in the frame parts to hold them from separation, and hard metal headless pins interspersed with said fastening devices and extending through and fitting in rigid frictional connection in openings in the frame parts, and grooved at their ends, and wedge keys engaging said grooves and frame parts.

5. A frame for a punching or like machine composed of side plates cut away at the forward side of the frame to form a throat opening and an interposed cast metal filler, having parts which support the plates at the margins of the throat opening, attaching devices piercing the plates and the filler for fixing the frame parts together, the filler being provided at its top intermediate its ends with an upwardly opening recess, and a separate bearing block fitted in and removable upwardly from said recess and provided with a shaft bearing and bolted to said plates.

6. A frame for a punching or like machine composed of side plates, a cast metal filler embracing a throat piece of general horse shoe shape, with the arms between and supporting the plates at the margins of the throat opening, means piercing the frame parts to fasten them together, the upper member of the throat piece being provided with an upwardly opening recess, and a bearing block having a journal opening for a shaft removably seated in said recess and detachably bolted to the side plates.

7. A frame for a punching or like machine composed of side plates cut away to provide a throat opening, a cast metal throat piece filling the space between and rigidly fixed to the plates and supporting the plates at the margins of the throat opening, integral lugs rising from the throat piece intermediate its ends and a bearing block, having a journal opening for a shaft, removably seated between said lugs and bolted to the side plates, said lugs being provided in line with the bearing block opening with clearance openings through which a shaft may pass.

8. A frame for a punching, or a like machine composed of side plates cut away to provide a throat opening, a cast metal throat piece filling the space between and rigidly fixed to said plates, a tool head fixed to the frame above said throat opening, there being arranged between the marginal portions of the plates filler members which are integral with the throat piece, integral lugs rising from the throat piece, the rear one of which is integral with the adjacent top filler member, a bearing block fitted between said lugs, and a separately formed upper filler member extending between the other lug and said head.

9. In a punching or like machine, a frame composed of side plates cut away to provide a throat opening and an interposed cast metal filler fixed rigidly to the plates and comprising a throat piece partially surrounding the throat opening and other integral members arranged between the marginal portions of the plates, a tool head fixed to the frame above said throat opening provided with a tool actuating device, said filler being provided between the ends of the frame with an upwardly opening recess, a bearing block for the operating shaft removably seated in said recess and bolted to the side plates, a second shaft bearing integral with the rear filler member, a third shaft bearing carried by said head and an operating shaft mounted in said bearing block and said second and third bearings and operatively connected with said tool actuating device.

10. A punching or like machine comprising a frame composed of side plates cut away to provide a throat opening, a throat piece between and rigidly fixed to the plates and a tool head fixed to and between the frame plates above the throat opening and made a part separate from the throat piece, said head having an upwardly facing part which bears upwardly against a downwardly facing part of the upper member of the throat piece.

11. A punching or like machine comprising a frame composed of side plates cut away to provide a throat opening, a throat piece between and rigidly fixed to said plates, a tool head above said throat opening separable from the throat piece and having parts which extend between the front margins of said frame plates, the upper member of the throat piece extending at its front end over and engaging an upwardly facing portion of the head, and means piercing the frame plates, the head and said forward end of the throat piece to rigidly fix said parts together.

12. A punching or like machine comprising a frame composed of side plates cut away to provide a throat opening, a throat piece between and rigidly fixed to said plates, a tool head above said throat opening having parts which overlap the front margins of said frame plates, said head being formed with a rearwardly opening socket having an upwardly facing wall and the forward end of the upper throat piece member entering said socket and engaging said upwardly facing wall and means piercing the side plates, the head and the said forward end of the throat piece for rigidly fixing said parts together.

13. In a punching or shearing machine, the combination with a frame provided with a forwardly opening throat, a tool carriage slidable in the forward end of the frame above the throat, an operating shaft rotatively mounted in the frame having means at its forward end for operating the carriage, a clutch device on the rear end of said operating shaft for connecting driving power to the shaft, a foot treadle at the front end of the frame, a lever pivoted to the frame in rear of the throat and connected with said foot treadle, a rearwardly extending link connecting said lever with said clutch, a pivoted clutch actuating and clutch locking lever at the front of the frame, and a link extending forwardly from said first lever and connecting it to the clutch actuating and clutch locking lever.

14. In a punching or shearing machine, the combination with a frame provided with a forwardly opening throat, a carriage slidable in the forward end of the frame above the throat, an operating shaft rotatively mounted in the frame having means at its forward end for operating the carriage, a clutch device on the rear end of said shaft for connecting driving power to the shaft, and a forwardly extending hand lever pivoted to the forward end of the frame and provided with an arm which is operatively connected with said clutch device and with a locking device for locking the clutch in inoperative position for continuous operation of the tool.

15. In a punching or shearing machine, the combination with a frame provided at its front end with a tool head having tool actuating means and a power shaft rotatively mounted in said frame and operatively connected with the tool actuating means, of a clutch device embracing a continuously rotative part normally loose on said shaft, a clutch collar slidable but non-rotative on said shaft and having means to interlock it to the continuously rotative part, a tripping plate carried by the collar and formed with a cam, means tending to normally hold said collar interlocked with said continuously rotative part, and a tripping device carried by the frame and movable into and out of the path of the cam for shifting the clutch collar to unclutching position.

16. In a punching or shearing machine, the combination with a frame provided at its front end with a tool head having tool actuating means and a power shaft rotatively mounted in said frame and operatively connected with the tool actuating means, of a clutch device embracing a continuously rotative part normally loose on said shaft, a clutch collar slidable but non-rotative on said shaft and having means to interlock it with the continuously rotative part, a tripping plate carried by the collar and formed with a cam, a spring-pressed, reciprocable locking pin carried by the frame and adapted to engage the cam to disconnect the clutch collar from said rotative part, and means tending to hold the collar interlocked with said continuously rotative part.

17. In a punching or shearing machine, the combination with a frame provided at its front end with a tool head having tool actuating means and a power shaft rotatively mounted in said frame and operatively connected with the tool actuating means, of a clutch device embracing a continuously rotative part normally loose on said shaft, a clutch collar slidable but nonrotative on said shaft and having means to interlock it with the continuously rotative part, a tripping plate carried by the collar and formed with a cam, means tending to normally hold said collar interlocked with said continuously rotative part, a tripping device carried by the frame and movable into and out of the path of the cam for shifting the clutch collar to unclutching position, and means for positively locking said tripping plate to said clutch collar arranged to permit the plate to be angularly adjusted on the collar relatively to a radial plane of the collar.

18. In a punching or shearing machine, a frame, a tool head therein having a reciprocable tool actuating mechanism, a power shaft for operating said tool actuating mechanism and a clutch device for connecting said tool actuating mechanism with and disconnecting it from the power embracing a clutch collar, a tripping plate carried by the collar and fastening bolts for the tripping plate adapted to engage a series of spaced openings on the collar, said series of openings being longer than the plate whereby the plate may be angularly adjusted on the collar.

19. In a punching or shearing machine, a frame, a tool head therein having a reciprocable tool actuating mechanism, a power shaft for operating said tool actuating mechanism and a clutch device for connecting said tool actuating mechanism with and disconnecting it from the power embracing a tripping device on the clutch device having means for positively fixing it to the clutch device and for angularly adjusting it to arrest the tool actuating mechanism in different parts of its stroke and thereby arrest the tool at varying distances from the work.

20. In a punching or shearing machine, a frame, a tool head therein having a reciprocable tool actuating mechanism, a power shaft for operating said tool actuating mechanism and a clutch device for connecting said tool actuating mechanism with and disconnecting it from the power embracing a slidable clutch collar having means tending to normally hold it in clutching position, a tripping plate carried by said collar and formed with a cam, a tripping device mounted on the frame and movable into and out of the path of said cam and adapted to shift the collar out of clutching position and screw bolts extending through said plate and into the collar for fastening the plate to the collar, the bolt openings in the collar being arranged to permit the plate to be angularly adjusted relatively to a radial plane of the collar.

21. In a punching or shearing machine, a frame, a tool head therein having a reciprocable tool actuating mechanism, a power shaft for operating said tool actuating mechanism and a clutch device for connecting said tool actuating mechanism with and disconnecting it from the power embracing a clutch collar, a tripping plate carried by the collar, fastening bolts for the tripping plate adapted to engage a series of spaced openings on the collar, said series of openings being longer than the plate whereby the plate may be angularly adjusted on the collar, and interlocking parts on the collar and tripping plate arranged to avoid shearing stress on the fastening bolts.

In testimony, that I claim the foregoing as my invention I affix my signature in the presence of two witnesses, this 26th day of July A. D. 1910.

HANS B. KRAUT.

Witnesses:
W. L. HALL,
WILLIAM GOLDBERGER.

---

Copies of this patent may be obtained for five cents each, by addressing the "Commissioner of Patents, Washington, D. C."